(12) United States Patent
Wurmfeld et al.

(10) Patent No.: US 10,474,809 B1
(45) Date of Patent: Nov. 12, 2019

(54) COMPUTER-BASED SYSTEMS AND COMPUTING DEVICES CONFIGURED TO UTILIZE ONE OR MORE AUTHENTICATION SERVERS FOR SECURING DEVICE COMMANDS TRANSMISSIONS AND METHODS OF USE THEREOF

(71) Applicant: Capital One Services, LLC, McLean, VA (US)

(72) Inventors: David Kelly Wurmfeld, Falls Church, VA (US); Kevin Osborn, Newton Highlands, MA (US)

(73) Assignee: Capital One Services, LLC, McClean, VA (US)

( * ) Notice: Subject to any disclaimer, the term of this patent is extended or adjusted under 35 U.S.C. 154(b) by 0 days.

(21) Appl. No.: 16/510,555

(22) Filed: Jul. 12, 2019

(51) Int. Cl.
*G06F 21/44* (2013.01)
*H04L 9/06* (2006.01)

(52) U.S. Cl.
CPC ............ *G06F 21/44* (2013.01); *H04L 9/0643* (2013.01)

(58) Field of Classification Search
CPC ...... G06F 21/121; G06F 21/57; G06F 21/572; G06F 21/6209; G06F 21/64; G06F 2221/2105
See application file for complete search history.

(56) References Cited

U.S. PATENT DOCUMENTS

| | | | | |
|---|---|---|---|---|
| 8,880,898 B2* | 11/2014 | Smeets | ................. | G06F 21/121 380/247 |
| 2006/0020796 A1* | 1/2006 | Aura | .................... | H04L 9/3236 713/168 |
| 2015/0249639 A1* | 9/2015 | Onno | ................. | H04L 63/0876 709/203 |

* cited by examiner

*Primary Examiner* — Abiy Getachew
(74) *Attorney, Agent, or Firm* — Greenberg Traurig, LLP

(57) ABSTRACT

In some embodiments, securing device commands includes a first electronic device receiving a command authorization request message from a second electronic device, including a device command to be performed by the second electronic device, a command argument, and a first message authentication code (MAC) generated by applying a hash function to the device command, the command argument and a first counter value. The first electronic device generates a second MAC by applying the hash function to the device command, the command argument and a second counter value synchronized with the first counter value. The first electronic device compares the first MAC and the second MAC to authenticate the device command and transmit a command approval message or a command denial message. The command approval message causes the second electronic device to perform the device command and the command denial message causes the second electronic device to reject the device command.

20 Claims, 9 Drawing Sheets

COMPUTER-BASED SYSTEMS AND COMPUTING DEVICES CONFIGURED TO UTILIZE ONE OR MORE AUTHENTICATION SERVERS FOR SECURING DEVICE COMMANDS TRANSMISSIONS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based platforms/systems, improved computing devices/components and/or improved computing objects configured for one or more novel technological applications of securing device commands, such as, but is not limited to the control of automated teller machines (ATM) in the withdrawal, deposit, transfer and inquiry of funds, or other devices for access and manipulation of valuable data by electronic command.

BACKGROUND OF TECHNOLOGY

A computer network platform/system may include a group of computers (e.g., clients, servers, smart routers (e.g., trading smart routers)) and other computing hardware devices that are linked together through one or more communication channels to facilitate communication and/or resource-sharing, via one or more specifically programmed graphical user interfaces (GUIs) of the present disclosure, among a wide range of users.

Typically, electronic devices, such as ATMs, are controlled by electronic commands. Such electronic devices may often have unsecured communication interfaces that are susceptible to attacks, such as, but not limited to, fraudulent device commands, man-in-the-middle attacks and replay attacks.

SUMMARY OF DESCRIBED SUBJECT MATTER

In some embodiments, the present disclosure provides an exemplary method for securing device commands that includes at least the following steps of: receiving, by a first electronic device, a command authorization request message from a second electronic device, including: i) at least one first message authentication code (MAC), ii) at least one device command, and iii) at least one command argument; where the at least one device command is a respective command to be performed by the second electronic device; where the at least one first MAC has been generated by applying a one-way hash function to a first plurality of hash inputs; where the first plurality of hash inputs include: i) the at least one device command; ii) the at least one command argument; and iii) at least one first counter value; generating, by the first electronic device, at least one second MAC by applying the one-way hash function to a second plurality of hash inputs; where the second plurality of hash inputs include: i) the device command; ii) the at least one command argument; and iii) at least one second counter value; where the at least one first counter value is synchronized with the at least one second counter value; comparing, by the first electronic device, the at least one first MAC and the at least one second MAC to authenticate the at least one device command; and transmitting, by the first electronic device, one of: i) at least one command approval message to the second electronic device when the at least one first MAC matches the at least one second MAC, or ii) at least one command denial message to the second electronic device when the at least one first MAC does not match the at least one second MAC; where the at least one command approval message is configured to cause the second electronic device to i) perform the at least one device command and ii) increment the at least one first counter value; and where the at least one command denial message is configured to cause the second electronic device to i) reject the at least one device command and ii) increment the at least one first counter value.

In some embodiments, the present disclosure provides an exemplary method for securing device commands that includes at least the following steps of: generating, at a second electronic device, at least one first MAC by applying a one-way hash function to a first plurality of hash inputs; where the first plurality of hash inputs include: i) an at least one device command; ii) an at least one command argument; and iii) at least one first counter value; where the at least one device command is a respective command to be performed by the second electronic device; generating, at the second electronic device, a command authorization request message, including: i) at least one first message authentication code (MAC), ii) at least one device command, and iii) at least one command argument; transmitting the command authorization request message to a first electronic device; receiving a response at the second electronic device from the first electronic device; where the response is generated according to a comparison of the at least one first MAC with an at least one second MAC; where the at least one second MAC is generated by applying the one-way hash function to a second plurality of hash inputs; where the second plurality of hash inputs include: i) the device command; ii) the at least one command argument; and iii) at least one second counter value; where the at least one first counter value is synchronized with the at least one second counter value; where the response includes: i) at least one command approval message to the second electronic device when the at least one first MAC matches the at least one second MAC, or ii) at least one command denial message to the second electronic device when the at least one first MAC does not match the at least one second MAC; where the second electronic device is configured to i) perform the at least one device command and ii) increment the at least one first counter value, upon receiving the at least one command approval message; and where the second electronic device is configured to i) reject the at least one device command and ii) increment the at least one first counter value, upon receiving the at least one command denial message.

In some embodiments, the present disclosure provides an exemplary system for securing device commands that includes at least the following features of: an electronic device in communication with an authorization device, the electronic device configured to: generate a command authorization request message, including: i) at least one first message authentication code (MAC), ii) at least one device command, and iii) at least one command argument; where the at least one device command is a respective command to be performed by the electronic device; where the at least one first MAC has been generated at the electronic device by applying a one-way hash function to the at least one device command, the at least one command argument, and at least one first counter value; transmit the command authorization request message to the authorization device; receive a response from the authorization device; where the response is generated according to a comparison of the at least one first MAC with an at least one second MAC; where the at least one second MAC is generated by applying the one-way hash function to the device command, the at least one command argument and at least one second counter value; where the at least one first counter value is equal to the at least one second counter value; where the response includes: i) at least one command approval message to the second electronic device when the at least one first MAC matches the at least one second MAC, or ii) at least one command denial message to the second electronic device when the at least one first MAC does not match the at least one second MAC; i) perform the at least one device command and ii) increment the at least one first counter value, upon receiving the at least one command approval message; and ii) reject the at least one device command and ii) increment the at least one first counter value, upon receiving the at least one command denial message.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
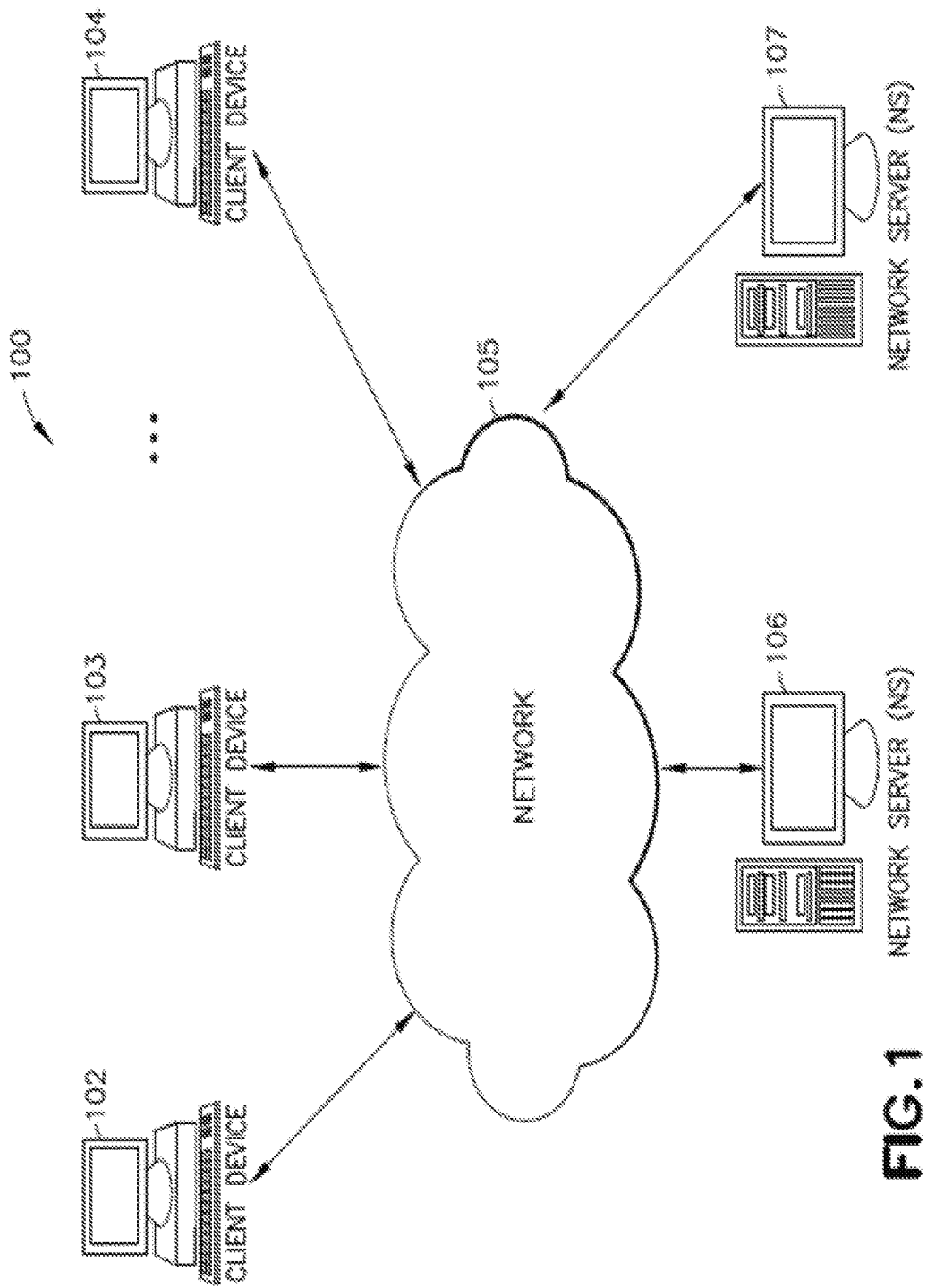
FIGS. 1-9 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems for securing device command with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems and/or exemplary inventive computer-based devices of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems and/or exemplary inventive computer-based devices of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, exemplary inventive inventive computer-based systems and/or exemplary inventive computer-based devices of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems and/or exemplary inventive computer-based devices of the present disclosure may be configured to handle numerous device commands transmissions that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems and/or exemplary inventive computer-based devices of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems and/or exemplary inventive computer-based devices of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems and/or exemplary inventive computer-based devices of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIG. 1 depicts a block diagram of an exemplary computer-based system/platform 100 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computer-based systems and/or exemplary inventive computer-based devices of the exemplary computer-based system 100 may be configured to manage a large number of members and/or concurrent transactions, as detailed herein. In some embodiments, the exemplary computer-based system 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 1, members 102-104 (e.g., clients) of the exemplary computer-based system 100 may include virtually any computing device capable of receiving and sending a message over a network (e.g., cloud network), such as network 105, to and from another computing device, such as servers 106 and 107 (e.g., an exemplary inventive authentication server and/or control server), each other, and the like. In some embodiments, the member devices 102-104 may be personal computers, multiprocessor systems, microprocessor-based or programmable consumer electronics, network PCs, exemplary automated teller machines (ATM) or account management terminals and the like. In some embodiments, one or more member devices within member devices 102-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 102-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 102-104 may include may run one or more applications, such as Internet browsers, mobile applications, voice calls, video games, videoconferencing, and email, among others. In some embodiments, one or more member devices within member devices 102-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 102-104 may be specifically programmed by either Java, .Net, QT, C, C++ and/or other suitable programming language. In some embodiments, one or more member devices within member devices 102-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer or machine readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing and/or exemplary inventive device command authentication. Although not shown in FIG. 1, in some embodiments, the exemplary server 106 or the exemplary server 107 may have connections to external systems like email, SMS messaging, text messaging, ad content providers, etc. Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 101-104.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 2:
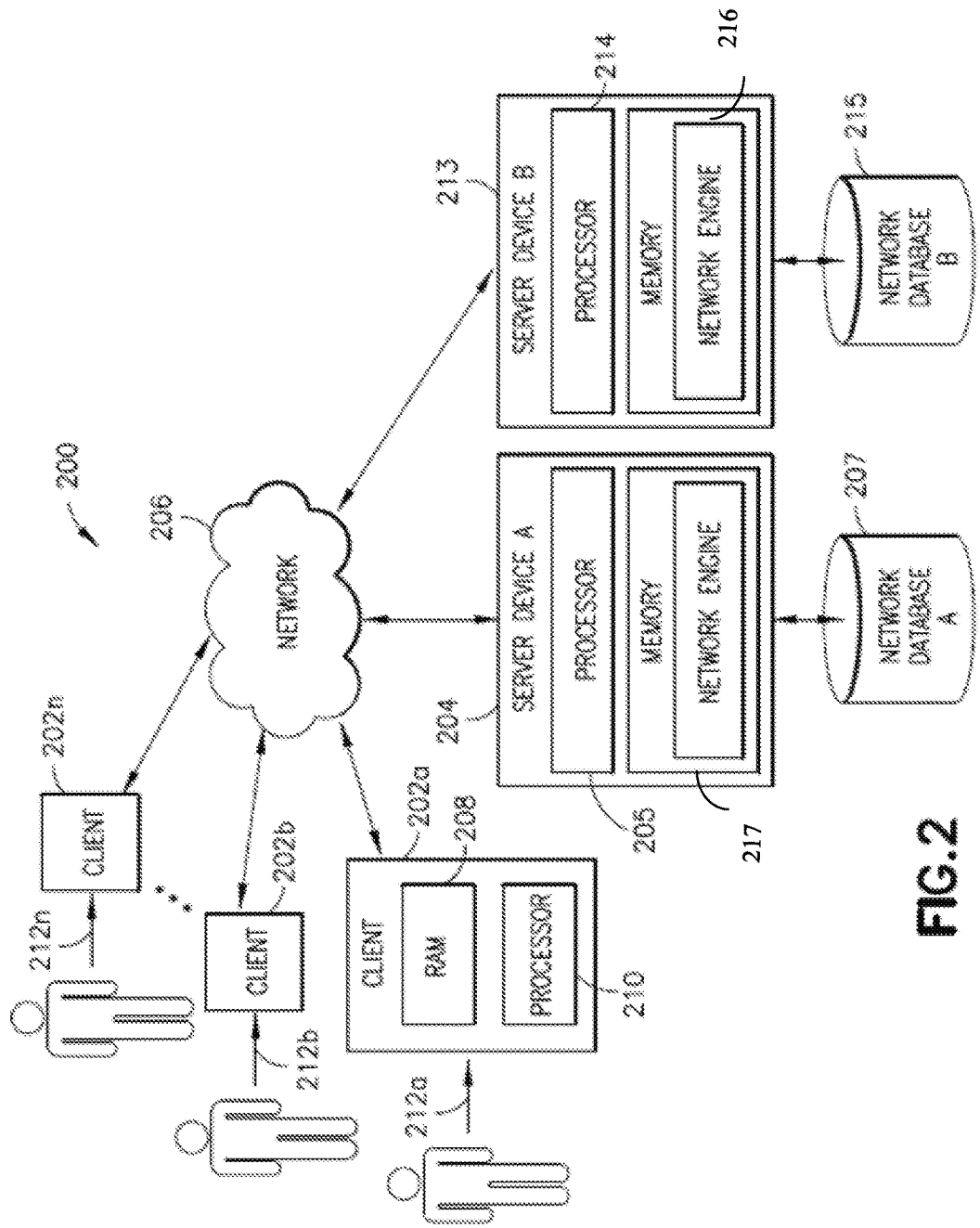

FIG. 2 depicts a block diagram of another exemplary computer-based system 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 202a, 202b thru 202n shown each at least includes a computer-readable medium, such as a random-access memory (RAM) 208 coupled to a processor 210 or FLASH memory. In some embodiments, the processor 210 may execute computer-executable program instructions stored in memory 208 for e.g., securing device commands of exemplary inventive systems. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 202a-n may also comprise a number of external or internal devices such as a mouse, a CD-ROM, DVD, a physical or virtual keyboard, a display, or other input or output devices. In some embodiments, examples of member computing devices 202a-n (e.g., clients) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices 202a-n may be specifically programmed with one or more application programs in accordance with one or more principles/methodologies detailed herein. In some embodiments, member computing devices 202a-n may operate on any operating system capable of supporting a browser or browser-enabled application, such as Microsoft™, Windows™, and/or Linux. In some embodiments, member computing devices 202a-n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 202a-n, users, 212a-n, may communicate over the exemplary network 206 with each other and/or with other systems and/or devices coupled to the network 206. As shown in FIG. 2, exemplary server devices 204 and 213 may be also coupled to the network 206. In some embodiments, one or more member computing devices 202a-n may be mobile clients.

In some embodiments, at least one database of exemplary databases 207 and 2015 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 3:
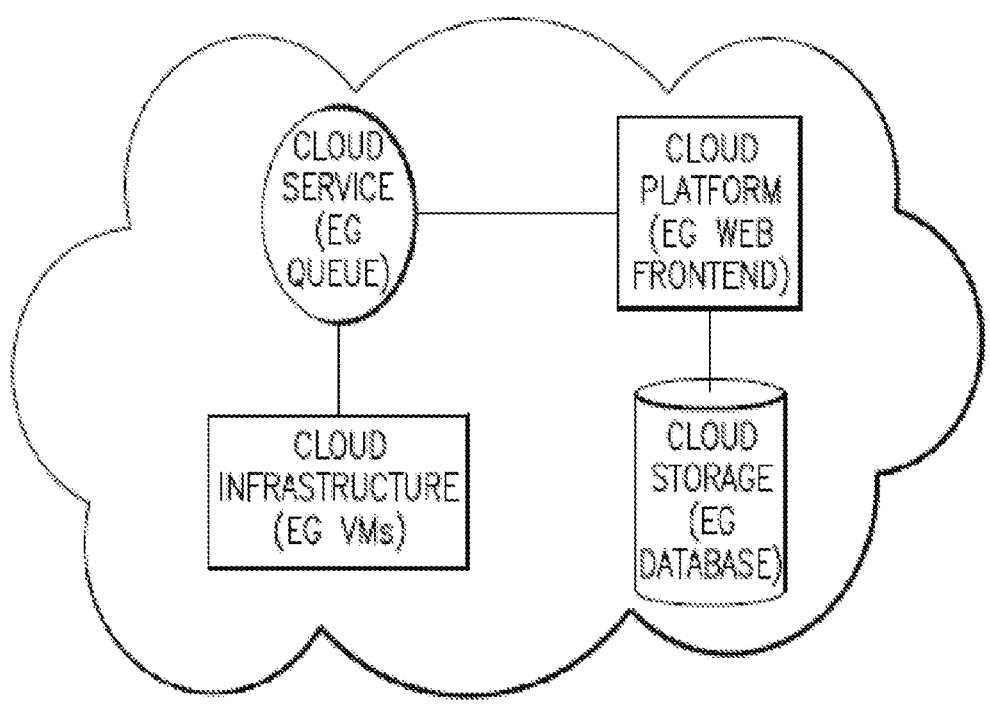
Figure 4:
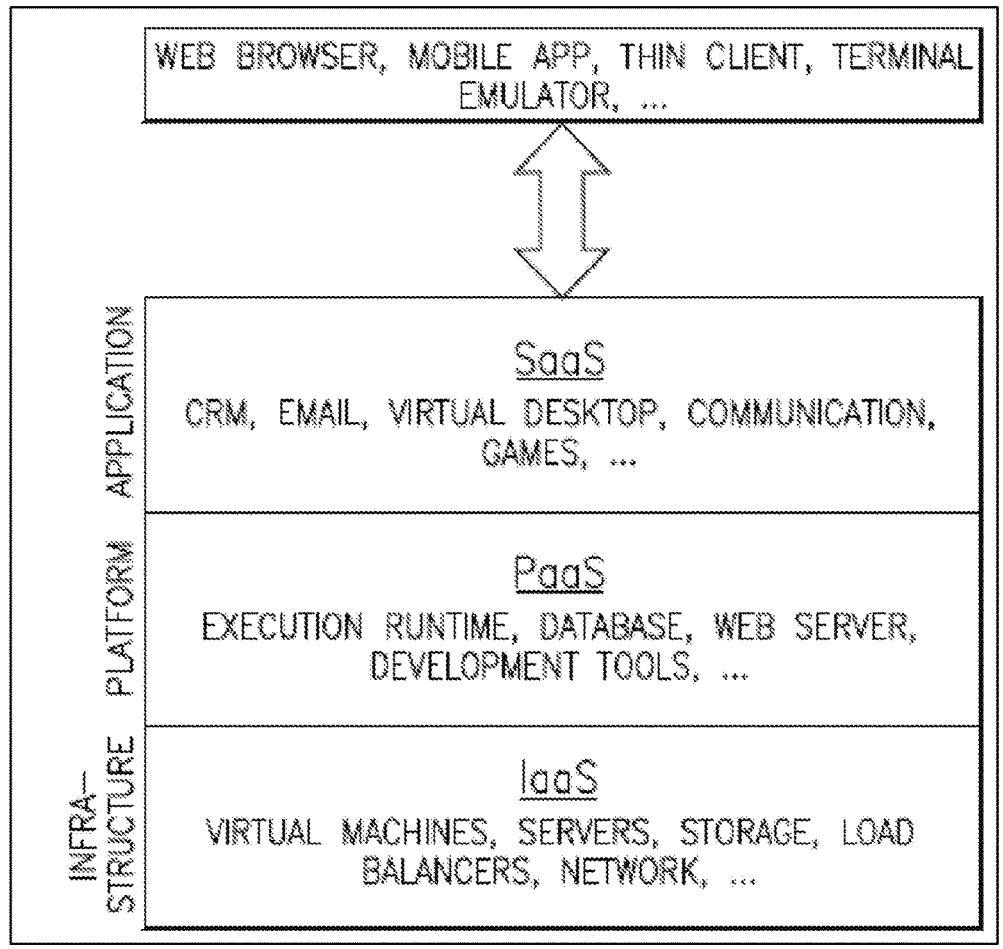

In some embodiments, the exemplary inventive computer-based systems and/or exemplary inventive computer-based devices of the present disclosure may be specifically configured to operate in an cloud computing/architecture such as, but not limiting to: infrastructure a service (IaaS), platform as a service (PaaS), and/or software as a service (SaaS). FIGS. 3 and 4 illustrate schematics of exemplary implementations of the cloud computing/architecture(s) in which the exemplary inventive computer-based systems and/or exemplary inventive computer-based devices of the present disclosure may be specifically configured to operate.

FIGS. 5 through 9 illustrate systems and methods of electronic device security including secured and unsecured interfaces utilizing networking and cryptographic messaging. The following embodiments provide technical solutions and/or technical improvements that overcome technical problems, drawbacks and/or deficiencies in the technical fields involving exploitation of interface security weaknesses in an electronic device. As explained in more detail, below, technical solutions and/or technical improvements herein include aspects of improved validation of device commands introduced across a secured or unsecured command interface by validating a one-time-password (OTP) with a counter. Based on such technical features, further technical benefits become available to users and operators of these systems and methods. Moreover, various practical applications of the disclosed technology are also described, which provide further practical benefits to users and operators that are also new and useful improvements in the art.

Figure 5:
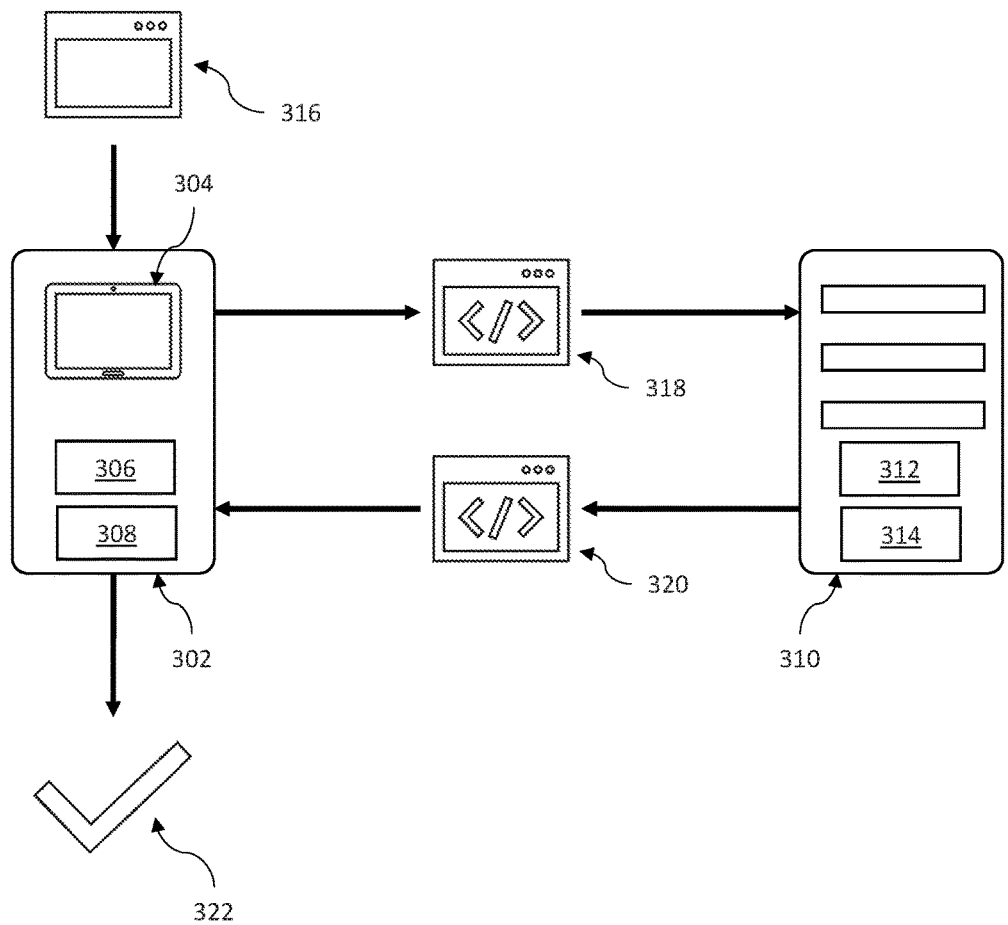

FIG. 5 is a diagram of an exemplary inventive computer-based system for securing device commands in accordance with one or more embodiments of the present disclosure.

In an embodiment, a first electronic device 310 is in communication with a second electronic device 302. Device commands can be issued to command actions to be executed by the second electronic device 302. In an embodiment, the first electronic device 310 and the second electronic device 302 may be used in conjunction to validate the device commands to prevent any fraudulent or compromised commands from being fulfilled. In an embodiment, message authentication codes (MAC) and counters can be leveraged to improve authentication of the device commands such that insecure interfaces, such as wired or wireless interface connections, including, e.g., universal serial bus (USB), WiFi, ethernet, serial, or other wired and wireless interfaces, are made secure. Thus, security attacks, such as, replay attacks and other man-in-the-middle attacks can be prevented.

In an embodiment, the second electronic device 302 receives a device command 316. In an embodiment, the second electronic device 302 may be a user facing or local device, such as, an automated teller machine (ATM) or other account management device, or other electronic device controllable by commands through an electronic interface. The second electronic device 302 receives the device command 316 and, if authentic, executes the command according to parameters and/or attributes of the command. In an exemplary embodiment, the second electronic device 302 is an ATM, however, in other embodiments, the second electronic device 302 can include any device that executes device commands for which security of the device commands is advantageous. For example, the second electronic device 302 can include, e.g., personal computers, printers, mobile computing devices, networking hardware, scanners, fax machines, automobile computing devices such as electronic control units (ECUs) and driver assistance and autonomous driving systems, among other electronic devices.

The device command 316 may include, e.g., a command and an argument. In some embodiments, the second electronic device 302 is an ATM and the command includes, e.g., fund withdrawal commands, deposit commands, fund transfer commands, purchasing commands, or other account and fund controls. The argument may include any parameter or attribute of the command. For example, the argument may be a dollar amount, a source and/or destination for fund movement, among other attributes of the commanded action.

In an embodiment, the second electronic device 302 may include the user interface device 304 for user interaction. For example, the user interface device 304 can be used to enter the device command 316, e.g., via an interface. The user interface device 304 may also be used to fulfill the device command 316, e.g., by displaying an account inquiry, a completed transfer, a completed purchase, or other command action. In embodiments, the user interface device 304 is also used to control the second electronic device 302 and view a status of the second electronic device 302, as well as other suitable display functions.

In an embodiment, the second electronic device 302 includes a counter 306. The counter 306 may include a suitable mechanism for maintaining a time-varying count. In an embodiment, the counter 306 includes an incremental counting mechanism including, e.g., a processing device, that increments a counter value upon a condition being satisfied. For example, once a threshold or a condition is met, the processing device can access data stored in a memory or storage device to increase a stored value by, e.g., one, or any other suitable interval. Embodiments also include, but are not limited to, time-based counters 306 that varies a counter value according to a time, either absolute or elapsed time, or by any other mechanism. The counter 306 may, therefore, produce the first counter value.

In some embodiments, the device command 316 includes a counter value, e.g., a first counter value. The first counter value can be provided with the device command 316 by, e.g., a separate device, such as a master device or commanding device that generates the device command 316, such as, e.g., a master server or remote device issuing commands. However, where the device command 316 is generated by the second electronic device 302 in response to, e.g., user input at a user interface device 304 such as a touch screen display, the second electronic device 302 may associate the first counter value with the device command 316 upon generation of the device command 316 but prior to fulfilling the device command. For example, a user may input a withdrawal command with a withdrawal amount into the interface 304. The counter 306 may be in communication with the interface 304 such that, prior to communicating the device command 316 across an interface to, e.g., a processing device of the second electronic device 302, the counter 306 assigns the first counter value to the device command 316. In other embodiments, the counter 306 is included with the interface 304. In yet other embodiments, the interface 304 is a separate device from the second electronic device 302 with a separate counter. In an exemplary embodiment, the interface 304 is in secure communication with the counter 306 and is integral with the second electronic device 302.

In an embodiment, the counter value is associated with a generated device command 316 where the device command 316 is generated at the second electronic device 302. However, where the device command 316 is generated by another device (e.g., a commanding device), such as, by the first electronic device 310, the counter value associated therewith is likewise generated by the commanding device, such as the first electronic device 310, prior to communication of the device command 316 to the second electronic device 302. Thus, a device command 316 includes a first counter value assigned prior to execution of the command.

In an embodiment, a message authentication module 308 of the second electronic device 302 generates a command authorization request 318. The message authentication module 308 may include, e.g., a processing device and a storage and/or memory device. In an embodiment, a shared one-way hash function, such as a cryptographic hash or other suitable function for generation MACs, is stored in the storage and/or memory device. The processing device uses the shared one-way hash function to generate a first MAC based on at least, e.g., the command, command arguments and/or the first counter value, among other suitable hash inputs to provide additional factors of security in generating a MAC. In some embodiments, a shared cryptographic key is used as a key with the shared one-way hash function. However, in one or more embodiments the first counter value is used as the key and the message authentication module 308 encodes the command and command arguments in a MAC using the first counter value as a key to a hash function. In some embodiments, the MAC is further encoded into another MAC with a different one-way hash function and/or another counter value. Additional encodings of MACs may be included, as well as splitting the command and argument to for form separate MACs, among other configurations. The MAC can be authenticated with a master device, such as an authentication server or other authentication device. In an embodiment, the master device is used to fulfill the device command 316. For example, where the device command 316 includes, e.g., a transfer of funds, the master device may initiate the transfer upon authentication of the first MAC.

In another embodiment, the device command 316 is introduced by a separate device and already includes the first counter value. The message authentication module 308 generates the first MAC based on a combination of the command, command arguments and the first counter value, using the shared cryptographic key with the shared one-way hash function. Thus, the first MAC is based on a counter value provided with the device command 316. Alternatively, the first counter value is a counter value produced by the counter 306. The use of the first counter value in generating the first MAC facilitates using the first MAC as a one-time password such that the first MAC is unique to the device command 316 being authenticated.

The first MAC and the device command 316, including the command and the command arguments, are transmitted to the first electronic device 310 via, e.g., a transmitter or transceiver across, e.g., a wired or wireless connection or network. The first electronic device 310 may operate as the master device and/or authentication device, such as, e.g., an authentication server. Thus, in an embodiment, the first electronic device 310 evaluates the first MAC and the device command 316 to determine authenticity to prevent fraud, tampering and/or corruption of device commands by, e.g., comparing the first MAC to an authentic MAC. Where the first MAC matches (e.g., is equivalent) the authentic MAC, the device command is deemed authentic and uncorrupted, and thus authorized for execution.

In an embodiment, to facilitate further improved security of the device command 316, the command authorization request 318 may be encrypted for transmission to the first electronic device 310. The command authorization request 318 may be encrypted by an encryption protocol that can be decrypted by the first electronic device 310, such as, e.g., symmetric key encryption, public key encryption, Pretty Good Privacy (PGP) encryption, among other suitable encryption schemes.

In an embodiment, the first electronic device 310 includes a counter 312 that is associated with the second electronic device 302. In some embodiments, the first electronic device 310 authenticates device commands for multiple devices, including the second electronic device 302. To do so, in an embodiment, the first electronic device 310 maintains, for the second electronic device 302, a device profile in, e.g., a storage and/or memory device. The device profile may include an identifier (device ID) associated with the second electronic device 302. Using the device profile and/or the device ID, the counter 312 may generate counter values in synchronism with the counter 306 of the second electronic device 302. As a result, in embodiments, a second counter value generated by the counter 312 is equal to the first counter value generated by the counter 306. As such, in an embodiment, the counter 312 is of a same type as the counter 306, such as an incremental counter or time-based counter as described above. To facilitate maintain synchronization between the counter 312 and the counter 306, the counter 312 can be configured to increment the second counter value upon receipt of the command authorization request 318.

In an embodiment, the first electronic device 310 uses the second counter value to validate the one-time password including the first MAC in the command authorization request 318. As a result, in an embodiment, the first electronic device 310 receives the command authorization request 318 including at least the command, the command arguments and the first MAC via, e.g., a receiver or transceiver.

In an embodiment, a message authentication module 314 receives the command, the command arguments and the first MAC. The message authentication module 314 may include, e.g., a processing device and a storage and/or memory device. The command, the command arguments and the first MAC can be stored in the storage and/or memory device along with a shared one-way hash function and a shared key. In an embodiment, the shared one-way hash function is shared with the second electronic device 302 according to the device profile and device ID. Similarly, the shared key can be shared with the second electronic device 302. In an embodiment, the processing device is configured to access the command, the command arguments, the first MAC, one-way hash function and the key. The message authentication module 314 may then generate a second MAC using the one-way hash function and the key based on at least the command and the command arguments. In an embodiment, the second MAC is generated based additionally on the second counter value generated by the counter 312, as well as any suitable additional hash inputs, as described above for generating the first MAC. In exemplary embodiments, the first MAC and the second MAC are generated based on corresponding sets of hash inputs. For example, both the first MAC and second MAC are generated based on the device command 316 and respective counter values as a way of verifying the authenticity of the device command 316 and counter values. Other hash inputs may be included such that the first MAC matches (e.g., is equivalent to) the second MAC where the device command 316 is authentic. However, other possible embodiments include using the second counter value as the key along with the shared one-way hash function. As with the second electronic device 302, the first electronic device 310 can generate more than one MAC, such as by encoding the second MAC into another MAC with another one-way hash function and/or counter value, and/or splitting the device command 316 into multiple parts to generate separate MACs.

In an embodiment, the message authentication module 314 authenticates the device command 316 by comparing the first MAC with the second MAC. The first MAC and second MAC are deemed to match where the first MAC and the second MAC are equivalent. The first MAC and the second MAC match where all of the respective hash functions, keys and hash inputs match. Because both the first electronic device 310 and the second electronic device 302 encode the device command 316 using a shared one-way hash, e.g., based on counter values, the first and second MAC only match where the one-way hash, counter value, and key match, thus indicating a trusted source to verify the source of the device command 316 and the command authorization request 318. For example, a matching of the first MAC and the second MAC can indicate that the first counter value is produced by the second electronic device 302, thus indicating a locally generated device command 316 in response to, e.g., user input at the user interface device 304. In embodiments, the use of a counter value can facilitate verification that another device introducing the device command 316 to second electronic device 302 is in sync with the first electronic device 310, and thus is a trusted source of device commands.

In particular, in an embodiment, where the first MAC is based on the first counter value, and the second MAC is based on the second counter value, the message authentication module 314 authentications the device command 316 where the first MAC and second MAC match. In another embodiment, the command authorization request 318 includes the first counter value, and where the first counter value and the second counter value match, and the first MAC and the second MAC match, then the message authentication module 314 authenticates the device command 316.

In an embodiment, upon a determination whether the device command 316 is verified, the message authentication module 314 generates a response message 320. Where the device command 316 is verified (e.g., the first MAC and the second MAC match or are otherwise equivalent), the response message 320 may include a command approval message. However, where the device command 316 cannot be verified (e.g., where the first MAC and the second MAC are not equivalent and/or include some discrepancy), the response message 320 may include a command denial message. In an embodiment, the response message 320 is sent to the second electronic device 302 and the counter 312 is caused to increment the second counter value. However, in another embodiment, the counter 312 increments the second counter value upon receipt of the command authorization request 318, and thus an increment upon communicating the response message 320 is unnecessary. Thus, the first MAC and the second MAC are compared according to the newly incremented second counter value, as described above. The second counter value is maintained until a new command authorization request 318 is received.

Upon generation and or transmission of the response message 320, the first electronic device 310 may log the device command 316 and the verification status (e.g., whether the device command 316 is authenticated by comparing the first MAC and the second MAC). Thus, in an embodiment, the first electronic device 310 may maintain a log of authenticated and/or not authenticated device commands 316. In some embodiments, the first electronic device 310 and/or the second electronic device 302 can employ the log to, e.g., identify an attacker, identify attack patterns to better prevent future attacks, including, e.g., using machine learning to identify times of day, week, month, year or other seasonality patterns to anticipate times of attack and methods of attack as different times, among other uses for the logs.

The second electronic device 302 can receive the response message 320 via, e.g., a receiver or a transceiver. In an embodiment, the counter 306 can be configured to increment the first counter value upon receipt of the response message 320 by an increment equal to the increment of the second counter value by the counter 312. Thus, the counter values at each of the first electronic device 310 and the second electronic device 302 are kept in sync. However, in other embodiments, the counter 306 and the counter 312 are time-based counters that are configured to re-generate the first counter value and the second counter value, respectively, according to, e.g., a time-stamp of the response message 320, a processor clock, or other time-keeping means.

In an embodiment, to facilitate further improved security, the response message 320 may be encrypted for transmission to the second electronic device 302. The response message 320 may be encrypted by an encryption protocol that can be decrypted by the second electronic device 302, such as, e.g., symmetric key encryption, public key encryption, Pretty Good Privacy (PGP) encryption, among other suitable encryption schemes.

In an embodiment, the message authentication module 308 is configured to access the response message 320 to determine whether the response message 320 include a command approval message or a command denial message. In an embodiment, the message authentication module 308 is further configured to deny the device command 316 in response to a command denial message. Thus, the device command 316 is not executed. In an embodiment, the unexecuted device command 316 is logged in, e.g., a memory or storage device to maintain a record of non-authenticated device commands, including, e.g., time data, reasons for denial, counter value, and other properties of the device command 316.

However, in an embodiment, in response to a command approval message, the message authentication module 308 in configured to instruct the second electronic device 302 to execute the device command 316 using, e.g., a processing device to produce, e.g., an executed command 322. Similarly, a log may be maintained of authenticated and executed device commands 316, including, e.g., device command properties as described above.

Figure 6:
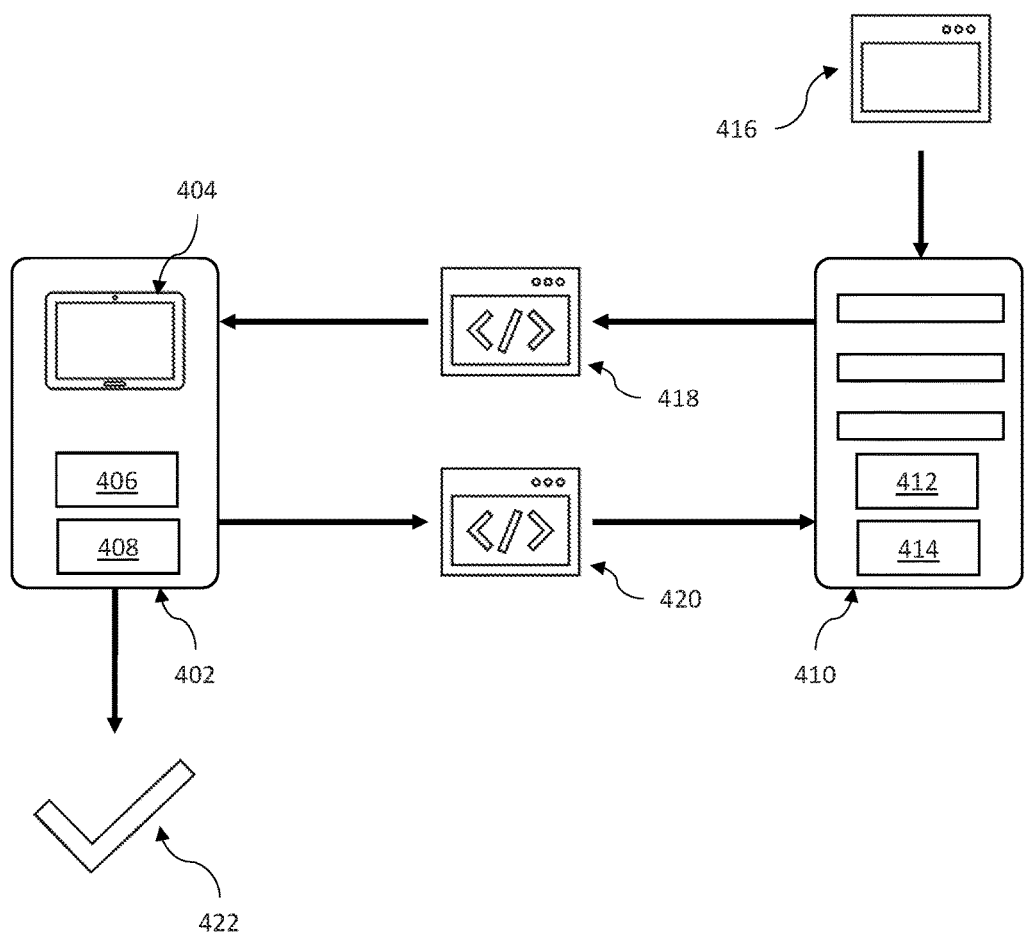

FIG. 6 is a block diagram of another exemplary computer-based system/platform for securing device commands in accordance with one or more embodiments of the present disclosure.

In an embodiment, a first electronic device 410 is in communication with a second electronic device 402. Device commands 416 can be issued to command actions on the part of the second electronic device 402. In an embodiment, the first electronic device 410 and the second electronic device 402 may be used in conjunction to validate the device commands 416 to prevent any fraudulent or compromised commands from being executed. In an embodiment, message authentication codes (MAC) and counters can be leveraged to improve authentication of the device commands such that insecure interfaces, such as wired or wireless interface connections, such as, e.g., universal serial bus (USB), WiFi, ethernet, serial, or other wired and wireless interfaces, are made secure. Thus, security attacks, such as, replay attacks and other man-in-the-middle attacks can be prevented.

In an embodiment, the first electronic device 410 receives a device command 416. In an embodiment, the first electronic device 410 may be a master or controlling device, such as, an authentication server, or master server to a client device. The first electronic device 410 receives and/or generates the device command 416. Where the device command 416 is an authentic device command 416 from the first electronic device 410, the first electronic device 410 and/or the second electronic device 402 executes the command according to parameters and/or attributes of the command. In an exemplary embodiment, the second electronic device 402 is an ATM, however, in other embodiments, the second electronic device 402 can include any device that executes device commands for which security of the device commands is advantageous. For example, the second electronic device 402 can include, e.g., personal computers, printers, mobile computing devices, networking hardware, scanners, fax machines, automobile computing devices such as electronic control units (ECUs) and driver assistance and autonomous driving systems, among other electronic devices.

The device command 416 may include, e.g., a command and an argument. In some embodiments, the second electronic device 402 is an ATM and the command includes, e.g., fund withdrawal commands, deposit commands, fund transfer commands, purchasing commands, or other account and fund controls. The argument may include any parameter or attribute of the command. For example, the argument may be a dollar amount, a source and/or destination for fund movement, among other attributes of the commanded action. Other embodiments with different devices are also contemplated. In some embodiments, the device command 416 include a counter value, e.g., a first counter value. The first counter value can be provided with the device command 416 by, e.g., a separate device, such as a commanding device that is the origin of the device command 416. However, where the device command 416 is generated by a second electronic device 402 in response to, e.g., user input at a display 404, the second electronic device 402 may associate the first counter value with the device command 416 upon generation of the device command 416 but prior to fulfilling the device command. In an embodiment, the second electronic device 402 may include a user facing or local device, such as, an automated teller machine (ATM), or other electronic device controllable by commands through an electronic interface.

In an embodiment, the first electronic device 410 includes a counter 412. The counter 412 may include a suitable mechanism for maintaining a varying counter value. In an embodiment, the counter 412 includes an incremental counting mechanism including, e.g., a processing device, that increments a counter value upon a condition being satisfied. For example, once a threshold or a condition is met, the processing device can access data stored in a memory or storage device to increase a stored value by, e.g., one, or any other suitable interval. Embodiments also include, but are not limited to, time-based counters 412 that varies a counter value according to a time, either absolute or elapsed time, or by any other mechanism. The counter 412 may, therefore, produce the first counter value. In an embodiment, the first counter value is generated, e.g., in an incremental or time-based fashion, in response to the generation of a device command 416 locally at the first electronic device 410 in response to, e.g., user input via, e.g., an application, a website, a remote device such as the second electronic device 402, or other method. Thus, a device command 416 includes a first counter value assigned prior to execution of the command.

In an embodiment, a message authentication module 414 of the first electronic device 410 generates a command authorization request 418. The message authentication module 414 may include, e.g., a processing device and a storage and/or memory device. In an embodiment, a shared one-way hash function is stored in the storage and/or memory device. The processing device uses the shared one-way hash function to generate a first MAC based on at least, e.g., the command, command arguments and/or the first counter value, among other suitable hash inputs to provide additional factors of security in generating a MAC. In some embodiments, a shared cryptographic key is used as a key with the shared one-way hash function. However, in one or more embodiments the first counter value is used as the key. Thus, the message authentication module 414 encodes the command and command arguments in the first MAC, which can be authenticated against an authentic MAC at, e.g., a verifying or authenticating device. Where the first MAC matches (e.g., is equivalent) the authentic MAC, the device command is deemed authentic and uncorrupted, and thus authorized for execution.

In an embodiment, the verifying or authenticating device is also an executing device to execute the device command 416. For example, where the device command 416 includes, e.g., a transfer of funds, the verifying or authenticating device may initiate the transfer upon authentication of the first MAC. In another example, where the device command 416 includes, e.g., a withdrawal of cash from an ATM, the ATM can authenticate the device commend 416 and execute the device command 416 by producing the cash.

In another embodiment, the device command 416 includes the first counter value. The message authentication module 414 generates the first MAC based on a combination of the command, command arguments and the first counter value, using the shared cryptographic key with the shared one-way hash function. Thus, the first MAC is based on a counter value associated with the device command 416. Alternatively, the first counter value is a counter value produced by the counter 412. The use of the first counter value in generating the first MAC facilitates using the first MAC as a one-time password such that the first MAC is unique to the device command 416 being authenticated. In an embodiment, the counter 412 is associated with the second electronic device 402. In some embodiments, the first electronic device 410 authenticates device commands 416 for multiple devices, including the second electronic device 402. To do so, in an embodiment, the first electronic device 410 maintains, for the second electronic device 402, a device profile in, e.g., a storage and/or memory device. The device profile may include an identifier (device ID) associated with the second electronic device 402. Using the device profile and/or the device ID, the counter 412 may generate counter values in synchronism with a counter 406 of the second electronic device 402. As a result, in embodiments, a first counter value generated by the counter 412 is equal to a counter value generated by the counter 406.

The first MAC and the device command 416, including the command and the command arguments, are transmitted in a command authorization request 418 to the second electronic device 402 via, e.g., a transmitter or transceiver across, e.g., a wired or wireless connection or network. In an embodiment, the second electronic device 402 evaluates the first MAC and the device command 416 to determine authenticity to prevent fraud, tampering and/or corruption of device commands.

In an embodiment, to further improve security of the device command 416, the command authorization request 418 may be encrypted for transmission to the second electronic device 402. The command authorization request 418 may be encrypted by an encryption protocol that can be decrypted by the second electronic device 402, such as, e.g., symmetric key encryption, public key encryption, Pretty Good Privacy (PGP) encryption, among other suitable encryption schemes.

In an embodiment, the second electronic device 402 may include the display 404 for user interaction. For example, the display 404 can be used to enter the device command 416, e.g., via an interface prior to providing the device command 416 to the first electronic device 410. The display 404 may also be used to fulfill the device command 416, e.g., by displaying an account inquiry, a completed transfer, a completed purchase, or other command action. In embodiments, the display 404 is also used to control the second electronic device 402 and view a status of the second electronic device 402, as well as other suitable display functions.

In an embodiment, the second electronic device 402 includes the counter 406 and a message authentication module 408. In an embodiment, the counter 406 is of a same type as the counter 412, such as an incremental counter or time-based counter as described above. In an embodiment, the counter 406 generates a second counter value, e.g., incrementally or according to a time. In an embodiment, upon receipt of the command authorization request 418, the second electronic device 402 generates a second counter value with the counter 406 in a synchronized fashion to the counter 412, e.g., by incrementing a stored second counter value in a memory or storage device, or by generating the second counter value according to, e.g., a message time-stamp, a processor clock, or other time-keeping means such that the second counter value is equal to the first counter value.

In an embodiment, the second electronic device 402 uses the second counter value to validate the one-time password including the first MAC in the command authorization request 418. As a result, in an embodiment, the second electronic device 402 receives the command authorization request 418 including at least the command, the command arguments and the first MAC via, e.g., a receiver or transceiver.

In an embodiment, the message authentication module 408 receives the command, the command arguments and the first MAC. The message authentication module 408 may include, e.g., a processing device and a storage and/or memory device. The command, the command arguments and the first MAC can be stored in the storage and/or memory device along with a shared one-way hash function and a shared key. In an embodiment, the shared one-way hash function is shared between the first electronic device 410 and second electronic device 402 according to the device profile and device ID. Similarly, the shared key can be shared between the first electronic device 410 and second electronic device 402 according to the device profile and device ID. In an embodiment, the processing device is configured to access the command, the command arguments, the first MAC, one-way hash function and the key. The message authentication module 408 may then generate a second MAC using the one-way hash function and the key based on the command and the command arguments. In an embodiment, the second MAC is generated based additionally on the second counter value generated by the counter 406. However, other possible embodiments include using the second counter value as the key along with the shared one-way hash function.

In an embodiment, the message authentication module 408 authenticates the device command 416 by comparing the first MAC with the second MAC. The first MAC and second MAC are deemed to match where the first MAC and the second MAC are equivalent. The first MAC and the second MAC match where all of the respective hash functions, keys and hash inputs match. Because both the first electronic device 410 and the second electronic device 402 encode the device command 416 using a shared one-way hash, e.g., based on counter values, the first and second MAC only match where shared one-way hash, counter value, and/or key are known, thus indicating a trusted source to verify the source of the device command 416 and the command authorization request 418. For example, a matching of the first MAC and the second MAC can indicate that the first counter value is produced by the first electronic device 410, thus indicating an authentic device command 416 from a master/server device. In other embodiments, the use of a counter value can facilitate verification that another device introducing the device command 416 to second electronic device 402 is in sync with the first electronic device 410, and thus is a trusted source of device commands.

In particular, in an embodiment, where the first MAC is based on the first counter value, and the second MAC is based on the second counter value, the message authentication module 408 authentications the device command 416 where the first MAC and second MAC match (e.g., the first MAC and the second MAC are equivalent). In another embodiment, the command authorization request 418 includes the first counter value, and where the first counter value and the second counter value match, and the first MAC and the second MAC match, then the message authentication module 408 authenticates the device command 416.

In an embodiment, upon a determination whether the device command 416 is verified, the message authentication module 408 generates a response message 420. Where the device command 416 is verified (e.g., the first MAC and the second MAC match or are otherwise equivalent), the response message 420 may include a command approval message. However, where the device command 416 cannot be verified (e.g., where the first MAC and the second MAC are not equivalent and/or include some discrepancy), the response message 420 may include a command denial message. In an embodiment, the response message 420 is sent to the first electronic device 410 and the counter 406 is caused to increment the second counter value. However, in another embodiment, the counter 412 increments the second counter value upon receipt of the command authorization request 418, and thus an increment upon communicating the response message 420 is unnecessary. Thus, the first MAC and the second MAC are compared according to the newly incremented second counter value, as described above. The second counter value is maintained until a new command authorization request 418 is received.

Upon generation and or transmission of the response message 420, the second electronic device 402 may log the device command 416 and the verification status (e.g., whether the device command 416 is authenticated by comparing the first MAC and the second MAC). Thus, in an embodiment, the second electronic device 402 may maintain a log of authenticated and/or not authenticated device commands 416. In some embodiments, the first electronic device 310 and/or the second electronic device 302 can employ the log to, e.g., identify an attacker, identify attack patterns to better prevent future attacks, including, e.g., using machine learning to identify times of day, week, month, year or other seasonality patterns to anticipate times of attack and methods of attack as different times, among other uses for the logs.

In an embodiment, where the response message 420 is a command approval message, the second electronic device 402 can be configured to execute the device command 416 using, e.g., a processing device to produce an executed command 422. Because the first and second MACs match, the source of the device command 416 is authenticated, thus indicating an authentic command and command argument. Because the first counter value is used with the first MAC, replay attacks can be thwarted because the first counter value facilitates a temporary authentication mechanism that can only be produced by a trusted device.

The first electronic device 410 can receive the response message 420 via, e.g., a receiver or a transceiver. In an embodiment, the counter 412 can be configured to increment the first counter value upon receipt of the response message 420 by an increment equal to the increment of the second counter value by the counter 406. Thus, the counter values at each of the first electronic device 410 and the second electronic device 402 are kept in sync. However, in other embodiments, the counter 406 and the counter 412 are time-based counters that are configured to re-generate the first counter value and the second counter value, respectively, according to, e.g., a time-stamp of the response message 420, a processor clock, or other time-keeping means.

In an embodiment, to facilitate further improve security, the response message 420 may be encrypted for transmission to the first electronic device 410. The response message 420 may be encrypted by an encryption protocol that can be decrypted by the first electronic device 410, such as, e.g., symmetric key encryption, public key encryption, Pretty Good Privacy (PGP) encryption, among other suitable encryption schemes.

In an embodiment, the message authentication module 414 is configured to access the response message 420 to determine whether the response message 420 includes a command approval message or a command denial message. In an embodiment, the message authentication module 414 is further configured to deny the device command 416 in response to a command denial message. Thus, the device command 416 is not executed. In an embodiment, the unexecuted device command 416 is logged in, e.g., a memory or storage device of the first electronic device 410 to maintain a record of non-authenticated device commands, including, e.g., time data, reasons for denial, counter value, and other properties of the device command 416.

However, in an embodiment, in response to a command approval message, the message authentication module 408 in configured to instruct the second electronic device 402 to execute the device command 416 using, e.g., a processing device to produce, e.g., an executed command 422. Similarly, a log may be maintained of authenticated and executed device commands 416, including, e.g., device command properties as described above, in one or both of the first electronic device 410 and the second electronic device 402 according to the response message 420.

Figure 7:
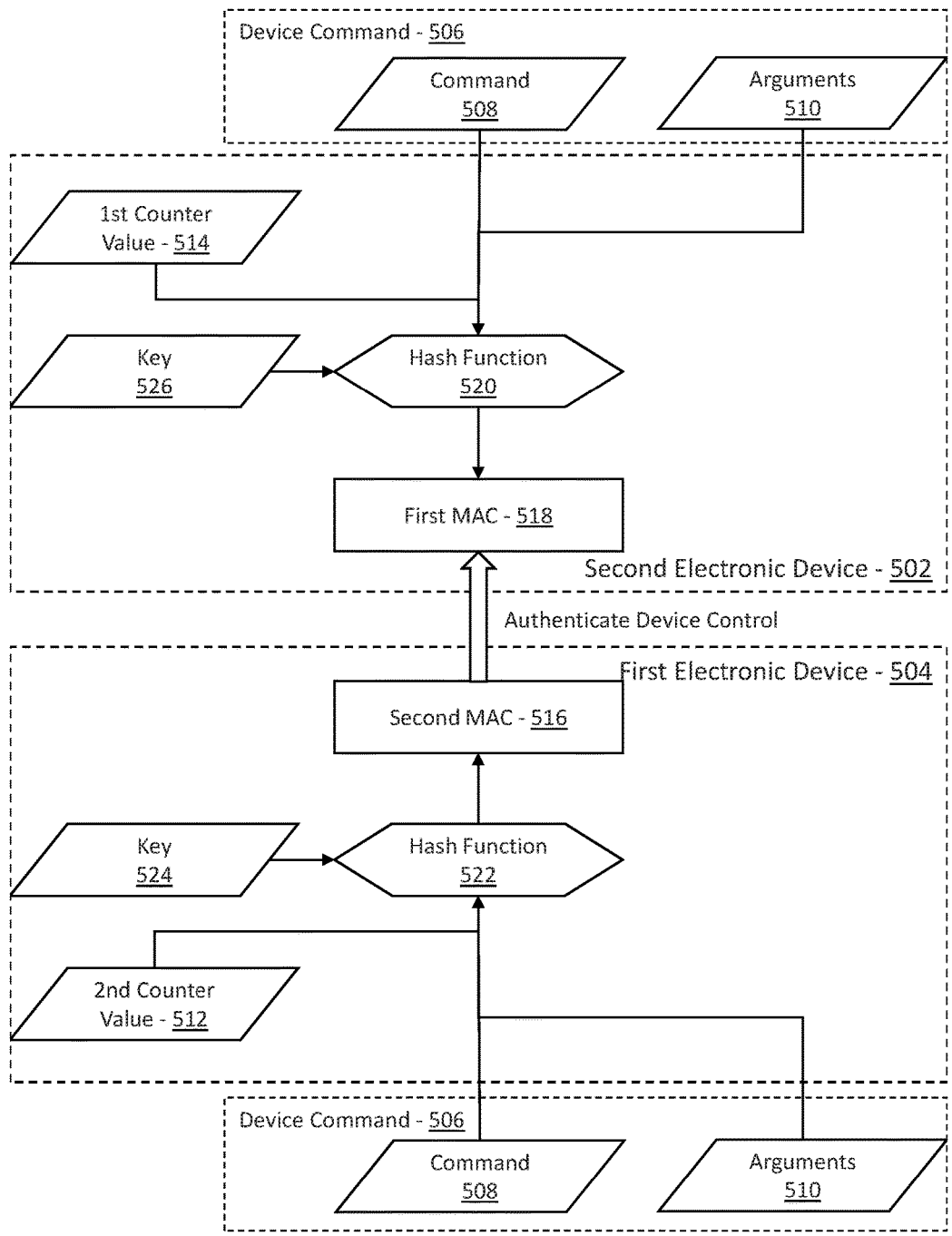

FIG. 7 illustrates a flow diagram of another exemplary methodology for securing device commands in accordance with one or more embodiments of the present disclosure.

In an embodiment, a device command 506 includes a command 508 and arguments 510. In an embodiment, the command 508 can include a device command, such as an executable code with an instruction for a device to perform an action. In some embodiments, the actions can include, but are not limited to, e.g., cash withdrawals. In an embodiment, the arguments 510 can include one or more properties of the command 508. For example, where the command 508 includes a cash withdrawal from, e.g., an ATM, an argument 510 can be associated with the command 508 including an amount of the cash withdrawal. Arguments 510 can include other properties, such as, but not limited to, denominations of cash, account from which to withdraw, among other properties.

In an embodiment, the device command 506 is authenticated prior to execution using the first electronic device 504 and/or the second electronic device 502. Where the device command 506 is a command for one of the first electronic device 504 or the second electronic device 502 to perform an action, the other of the first electronic device 504 or the second electronic device 502 can verify the authenticity of the device the command 506. For example, in some embodiments, the second electronic device 502 is, e.g., a device to execute the device command, such as an ATM, and the first electronic device 504 is, e.g., a device to issue the command, such as a server that issues commands for actions by the second electronic device 502. However, in other embodiments, the relationship can be the reverse, where the second electronic device 502 is, e.g., an ATM that issues commands, such as account commands, and the first electronic device 504 is, e.g., a server that receives commands regarding actions in a banking account from the second electronic device 502.

In an embodiment, to prevent fraud, theft, and other misuse of a user's funds, the device command 506 can be authenticated by verifying the source of the device command 506, e.g., a withdrawal command issued by the first electronic device 504 to be executed by the second electronic device 502, or other device command. In another embodiment, the device command 506 can be issued by a component of a device to be performed by the device. For example, an input device can issue a command to a processor of the, e.g., the second electronic device 502 to initiate an action. For example, a user can input a withdrawal command into a touchscreen of an ATM, the touchscreen can generate a device command 506 including the withdrawal command 508 to the processor of the second electronic device 502. Such a command can be verified by authenticating the device command 506 with the first electronic device 502 including, e.g., an authentication server.

In an embodiment, authentication of the device command 506 can be facilitated by processing the device command 506 at both the first electronic device 502 and the second electronic device 504. In some embodiments, the first electronic device 504, including, e.g., a device issuing the device command 506, generates a second MAC 516 using a hash function 522 based on the device command 506, a second counter value 512 and a key 524. The second MAC 516 and the device 506 may then be provided to the second electronic device 502, e.g., a device to execute the device command 506. In an embodiment, at the second electronic device 502, a hash function 520 uses the device command 506, including the command 508 and the arguments 510, along with a first counter value 514 and a key 526 to generate a first MAC 518.

According to an embodiment, the hash function 522 and the hash function 520 are based on symmetric encryption. Thus, the hash function 522 and the hash function 520 are equivalent functions. Authentication may occur where both hash functions 522 and 520 produced equivalent MACs, which proves that the information on which the MACs are based are equivalent. Trust can be determined where one of the pieces of information involved in hashing with the hash functions 522 and 520 is a secret piece of information that only a trusted source would have, such as, e.g., a secret or private key. Therefore, in an embodiment, to authenticate the source of the device command 506 as from the first electronic device 504, the hash functions 520 and 522 produce the first MAC 518 and the second MAC 516 using keys 526 and 524 that are secret shared keys, e.g., the first electronic device 504 and the second electronic device 502 have previously shared a private set of keys 526 and 524. Thus, the key 524 is equivalent to the key 522. Accordingly, if a device command 506 is accompanied by a MAC produced with a key other than a shared key that is equivalent to the key 526, then the accompanying MAC is proven inauthentic by a failure to match the first MAC 518 with the accompanying MAC. However, in an embodiment, the second MAC 516 is based on the key 524, which is a shared private key equivalent to key 522, thus providing evidence of authenticity of the accompanying device commend 506.

In some embodiments, the first MAC 518 and the second MAC 516 can be produced using asymmetric encryption, either alternatively to the symmetric encryption described above, or in combination therewith. In asymmetric encryption, the device command 506 and/or the second MAC 516 provided by the issuing device (in an embodiment, the first electronic device 504), is signed with a private key, such as key 524. The device command 506 and/or the second MAC 516 is communicated to, e.g., the second electronic device 502. In an embodiment, a public key can be provided to, or otherwise made accessible to the second electronic device 502, either in the communication with the signed second MAC 516 and/or device command 506, or separately therefrom. The hash function 520, or other suitable function, can then be used with the public key, e.g., key 526 in an embodiment, to verify the signature. Where the signature matches, evidence of authenticity of the source of the device command 506 is determined.

In some embodiments, symmetric and asymmetric encryption can be combined. For example, shared private keys can be used to generate the first and second MACs 518 and 516, which can then be signed using asymmetric techniques. In another embodiment, the device command 506 can be signed using asymmetric techniques, and then encrypted into a MAC using symmetric encryption techniques. Additionally, multiple layers of symmetric and/or asymmetric encryption can be used to provide further protection and evidence of authenticity, such as, e.g., using another hash function to produce a MAC from the second MAC 516 using a shared private key at the first electronic device. Other configurations are also contemplated.

However, even where an authentic key is used to generate a MAC, an attack, such as, e.g., a replay attack could be performed to cause the second electronic device 502 to perform an inauthentic device command. To facilitate the prevention of such attacks, among others, the hash function 522 and the hash function 520 are based on a second counter value 512 and a first counter value 514, respectively.

Accordingly, in embodiments of the present invention, counter values are employed to instill transience into the validity of a MAC. For example, the counter value can result in a varying, e.g., time-varying, value that is used as a basis for a hash function. Therefore, by incorporating the counter value into hashing at an initiating device, MAC values produced at a valid initiating device change based on the variation in the counter value. Accordingly, a purported initiating device may be validated where a valid counter value and counter value variation can be determined, for example, by synchronizing counter values between trusted devices. Accordingly, in an embodiment of the present invention, the hash function 522 utilizes the second counter value 512, which varies between each initiating of a device command. Thus, the basis of the second MAC 516 changes each time a second MAC 516 is generated by the hash function 522 due to the changing of the second counter value 512.

To validate the device command 506 and the second MAC 516, the executing device, e.g., the second electronic device 502, uses a first counter value 514 as a basis for the hash function 520. The first counter value 514 varies in sync with the variation of the second counter value 512 of first electronic device 504. As a result, the produced first MAC 518 from the hash function 520 varies based on the first counter value 514. Where a received MAC fails to match the first MAC 518, e.g., by using a previously used counter value, then it can be determined that the received MAC is based on an out of sync counter value, and thus, not authentic. Accordingly, in embodiments of the present invention, the first counter value 514 and the second counter value 512 are synchronized to provide evidence that a device command is authentic and not, e.g., a repeat or replay, among other forms of attack.

Accordingly, in an embodiment, the second electronic device 502 receives the device command 506 purporting to be initiated by the first electronic device 504. Because, e.g., the hash function 522 is shared and the second counter value 512 is synchronized, and thus identical to the hash function 520 and first counter value 514, the second MAC 516 matches the first MAC 518 such that the device command 506 may be authenticated. Therefore, in an embodiment, the first MAC 518 and the second MAC 516 are compared, and where the first MAC 518 and the second MAC 516 match, the hash functions, the keys and the counter values must be equivalent. Therefore, the origin of the device command 506 may be determined to be from a trusted source.

In an embodiment, the first counter value 514 and the second counter value 512 may each be incremented in a common fashion to alter the counter values while maintaining the synchronization. As a result, an invalid source may initiate a fraudulent device command 506 by, e.g., a replay attack, with a valid MAC, but invalid counter value because of the use of an out-of-date counter value that is not in sync with either the first electronic device 504 or the second electronic device 502. An out of date counter value alters the result of the hash function and changes the MAC. Accordingly, man-in-the-middle attacks over an unsecured interface can be for effectively defended against at least because a MAC is not reused for authentication.

In an embodiment, the first counter value 514 is a variable value that varies by, e.g., incrementing the value, or by generating a time-based incrementation, or other suitable incrementation scheme. Because the first MAC 518 is determined by the hash function 520 based on the first counter value 514, the first MAC 518 varies as the first counter value 514 increments. Thus, in order to authenticate a device command, a MAC accompanying the device command 506 must be based on an equivalent counter value.

Figure 8:
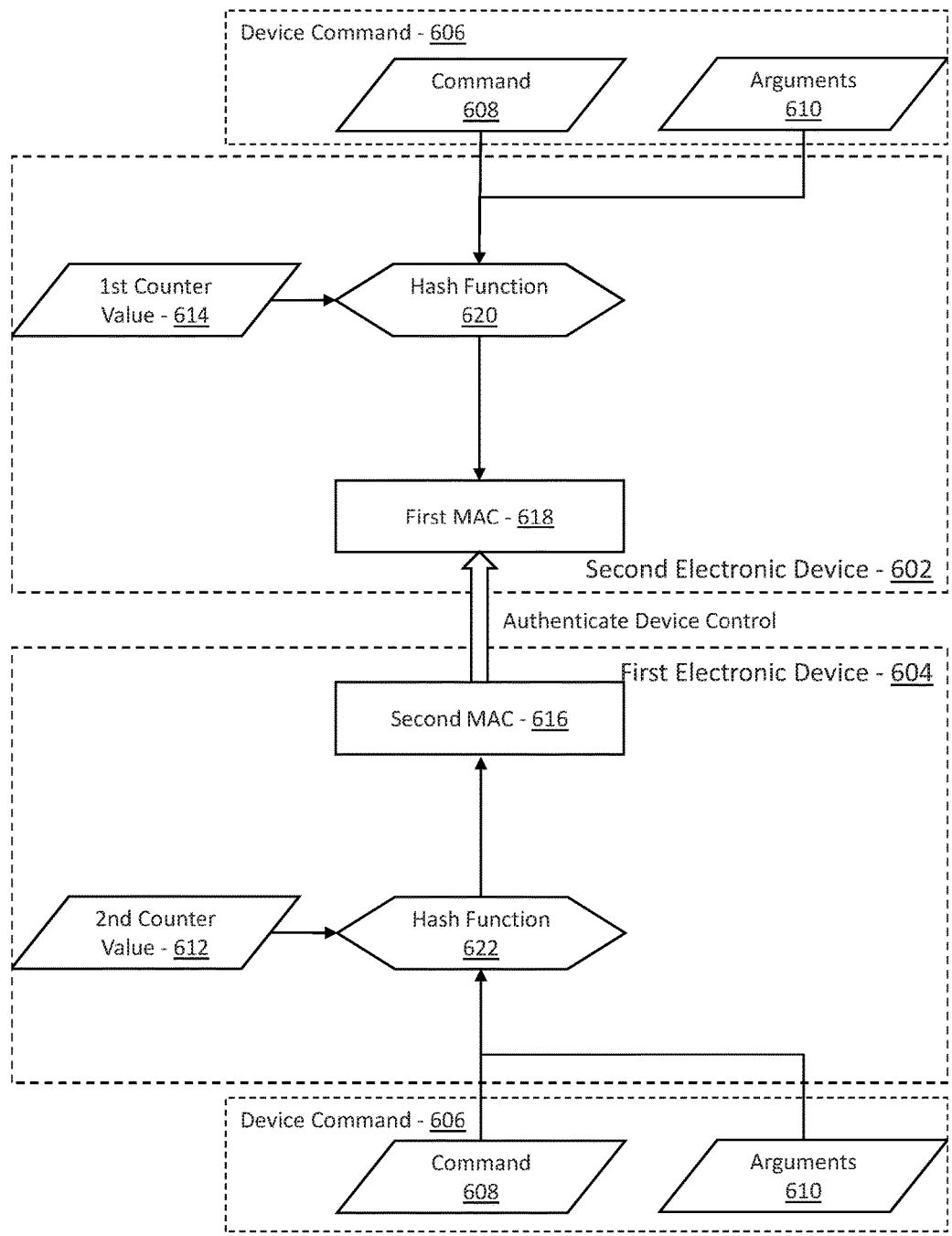

FIG. 8 illustrates a flow diagram of another exemplary methodology for securing device commands in accordance with one or more embodiments of the present disclosure.

In an embodiment, authentication of a device command 606 can be facilitated by processing the device command 606 at both a first electronic device 602 and a second electronic device 604. At the second electronic device 602, a hash function 620 uses the device command 606, including the command 608 and the arguments 610, along with a first counter value 614 to generate a first MAC 618. In an embodiment, the hash function 620 is a shared one-way hash function that depends on a cryptographic key including the first counter value 614. Thus, the second electronic device 602 must have both the correct hash function 620 and the correct second counter value 614 to generate a matching first MAC 618.

In an embodiment, the first electronic device 604 receives the device command 606 purporting to be initiated by the second electronic device 602 or by a component of the second electronic device 602. In an embodiment, the device command 606 is authenticated by generating a second MAC 616 based on the command 608 and arguments 610 along with using the hash function 622 and a second counter value 612 as a key to the hash function 622.

Where the first counter value 614 and the second counter value 612 are equivalent, the counters are in sync, and thus the shared hash function including the hash function 620 and the hash function 622 generate equivalent MACs based on the device command 606. As a result, in an embodiment, the first electronic device 604 and the second electronic device 602 may be authenticated by a matching of the generated first MAC 618 and second MAC 616.

Therefore, in an embodiment, the first MAC 618 is communicated to the first electronic device 604, or the second MAC 616 is communicated to the second electronic device 602. The first MAC 618 and the second MAC 616 are compared, and where the first MAC 618 and the second MAC 616 match, the origin of the device command 606 may be authenticated. The first counter value 614 and the second counter value 612 may each be incremented in a common fashion to alter the counter values while maintaining the synchronization. For example, each of the first counter value 614 and the second counter value 612 may be incremented after comparison of the first MAC 618 and the second MAC 616 by, e.g., incrementing the value, or by generating a time-based incrementation, or other suitable incrementation scheme.

As a result, an invalid source may initiate a fraudulent device command 606 by, e.g., a replay attack, with a valid MAC, but invalid counter value because of the use of an out-of-date counter value that is not in sync with either the first electronic device 604 or the second electronic device 602. An out of date counter value alters the result of the hash function and changes the MAC. Accordingly, man-in-the-middle attacks over an unsecured interface can be for effectively defended against at least because a MAC is not reused for authentication.

In an embodiment, the device command 606 and the second MAC 616 can be communicated in an encrypted fashion to the second electronic device 602 for execution. For example, the device command 606 and the second MAC 616 can, e.g., separately or together, be encrypted using a, e.g., symmetric or asymmetric encryption scheme, such as the symmetric and asymmetric encryption schemes described above. Accordingly, the device command 606 and the second MAC 616 can be hidden from unauthorized entities, such as, e.g., a man-in-the-middle, to further facilitate security of commands across an unsecured or secured interface.

Figure 9:
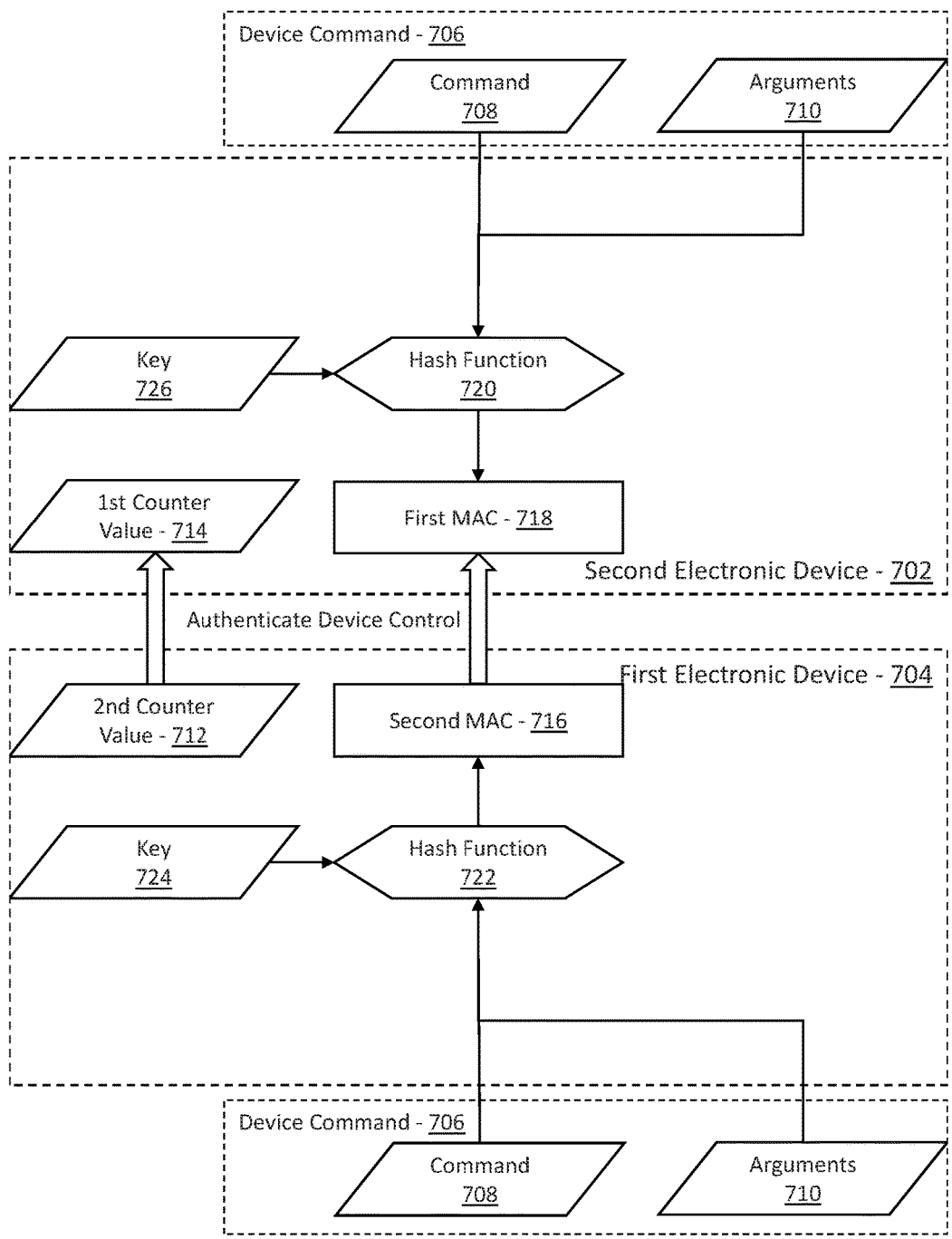

FIG. 9 illustrates a flow diagram of another exemplary methodology for securing device commands in accordance with one or more embodiments of the present disclosure.

In an embodiment, a device command 706 includes a command 708 and arguments 710. In an embodiment, the command 708 can include a device command, such as an executable code with an instruction for a device to perform an action. In some embodiments, the actions can include, but are not limited to, e.g., cash withdrawals. In an embodiment, the arguments 710 can include one or more properties of the command 708. For example, where the command 708 includes a cash withdrawal from, e.g., an ATM, an argument 710 can be associated with the command 708 including an amount of the cash withdrawal. Arguments 710 can include other properties, such as, but not limited to, denominations of cash, account from which to withdraw, among other properties.

In an embodiment, the device command 706 is authenticated prior to execution using the first electronic device 704 and/or the second electronic device 702. Where the device command 706 is a command for one of the first electronic device 704 or the second electronic device 702 to perform an action, the other of the first electronic device 704 or the second electronic device 702 can verify the authenticity of the device the command 706. For example, in some embodiments, the second electronic device 702 is, e.g., a device to execute the device command, such as an ATM, and the first electronic device 704 is, e.g., a device to issue the command, such as a server that issues commands for actions by the second electronic device 702. However, in other embodiments, the relationship can be the reverse, where the second electronic device 702 is, e.g., an ATM that issues commands, such as account commands, and the first electronic device 704 is, e.g., a server that receives commands regarding actions in a banking account from the second electronic device 702.

In an embodiment, to prevent fraud, theft, and other misuse of a user's funds, the device command 706 can be authenticated by verifying the source of the device command 706, e.g., a withdrawal command issued by the first electronic device 704 to be executed by the second electronic device 702, or other device command. In another embodiment, the device command 706 can be issued by a component of a device to be performed by the device. For example, an input device can issue a command to a processor of the, e.g., the second electronic device 702 to initiate an action. For example, a user can input a withdrawal command into a touchscreen of an ATM, the touchscreen can generate a device command 706 including the withdrawal command 708 to the processor of the second electronic device 702. Such a command can be verified by authenticating the device command 706 with the first electronic device 702 including, e.g., an authentication server.

In an embodiment, authentication of the device command 706 can be facilitated by processing the device command 706 at both the first electronic device 702 and the second electronic device 704. In some embodiments, the first electronic device 704, including, e.g., a device issuing the device command 706, generates a second MAC 716 using a hash function 722 based on the device command 706 and a key 724. The second MAC 716 and the device 706 may then be provided to the second electronic device 702, e.g., a device to execute the device command 706. In an embodiment, at the second electronic device 702, a hash function 720 uses the device command 706, including the command 708 and the arguments 710, along with a key 726 to generate a first MAC 718.

According to an embodiment, the hash function 722 and the hash function 720 are based on symmetric encryption. Thus, the hash function 722 and the hash function 720 are equivalent functions. Authentication may occur where both hash functions 722 and 720 produced equivalent MACs, which proves that the information on which the MACs are based are equivalent. Trust can be determined where one of the pieces of information involved in hashing with the hash functions 722 and 720 is a secret piece of information that only a trusted source would have, such as, e.g., a secret or private key. Therefore, in an embodiment, to authenticate the source of the device command 706 as from the first electronic device 704, the hash functions 720 and 722 produce the first MAC 718 and the second MAC 716 using keys 726 and 724 that are secret shared keys, e.g., the first electronic device 704 and the second electronic device 702 have previously shared a private set of keys 726 and 724. Thus, the key 724 is equivalent to the key 722. Accordingly, if a device command 706 is accompanied by a MAC produced with a key other than a shared key that is equivalent to the key 726, then the accompanying MAC is proven inauthentic by a failure to match the first MAC 718 with the accompanying MAC. However, in an embodiment, the second MAC 716 is based on the key 724, which is a shared private key equivalent to key 722, thus providing evidence of authenticity of the accompanying device commend 706.

In some embodiments, the first MAC 718 and the second MAC 716 can be produced using asymmetric encryption, either alternatively to the symmetric encryption described above, or in combination therewith. In asymmetric encryption, the device command 706 and/or the second MAC 716 provided by the issuing device (in an embodiment, the first electronic device 704), is signed with a private key, such as key 724. The device command 706 and/or the second MAC 716 is communicated to, e.g., the second electronic device 702. In an embodiment, a public key can be provided to, or otherwise made accessible to the second electronic device 702, either in the communication with the signed second MAC 716 and/or device command 706, or separately therefrom. The hash function 720, or other suitable function, can then be used with the public key, e.g., key 726 in an embodiment, to verify the signature. Where the signature matches, evidence of authenticity of the source of the device command 706 is determined.

In some embodiments, symmetric and asymmetric encryption can be combined. For example, shared private keys can be used to generate the first and second MACs 718 and 716, which can then be signed using asymmetric techniques. In another embodiment, the device command 706 can be signed using asymmetric techniques, and then encrypted into a MAC using symmetric encryption techniques. Additionally, multiple layers of symmetric and/or asymmetric encryption can be used to provide further protection and evidence of authenticity, such as, e.g., using another hash function to produce a MAC from the second MAC 716 using a shared private key at the first electronic device. Other configurations are also contemplated.

However, even where an authentic key is used to generate a MAC, an attack, such as, e.g., a replay attack could be performed to cause the second electronic device 702 to perform an inauthentic device command. To facilitate the prevention of such attacks, among others, the hash function 722 and the hash function 720 are based on a second counter value 712 and a first counter value 714, respectively.

Accordingly, in embodiments of the present invention, counter values are employed to instill transience into the validity of a device command 706. For example, the counter value can result in a varying, e.g., time-varying, value that is used to authenticate the device command 706 by source and by time. Accordingly, a purported initiating device may be validated where a valid counter value and counter value variation can be determined, for example, by synchronizing counter values between trusted devices. Accordingly, in an embodiment of the present invention, the first electronic device 704 utilizes the second counter value 512, which varies between each initiating of a device command.

To validate the device command 706 and the second MAC 716, the executing device, e.g., the second electronic device 702, uses a first counter value 714 to validate an accompanying counter value with the device command 706. The first counter value 714 varies in sync with the variation of the second counter value 712 of first electronic device 704. Where a received counter value fails to match the first counter value 714, e.g., by using a previously used counter value, then it can be determined that the received device command is not authentic in time. Accordingly, in embodiments of the present invention, the first counter value 714 and the second counter value 712 are synchronized to provide evidence that a device command is authentic and not, e.g., a repeat or replay, among other forms of attack.

Accordingly, in an embodiment, the second electronic device 702 receives the device command 706 purporting to be initiated by the first electronic device 704. Because, e.g., the hash function 722 is shared and the key 724 is shared, and thus identical to the hash function 520 and key 726, the second MAC 716 matches the first MAC 718 such that the device command 706 may be authenticated. However, to provide further evidence that the received device command is not a copy or replay, the first counter value 714 and the second counter value 712 are also compared. Where the first counter value 714 and the second counter value 712 are equivalent, and thus synchronized, the authenticity of the device command 706 can be further confirmed.

In an embodiment, the first counter value 714 and the second counter value 712 may each be incremented in a common fashion to alter the counter values while maintaining the synchronization. As a result, an invalid source may initiate a fraudulent device command 706 by, e.g., a replay attack, with a valid MAC, but invalid counter value because of the use of an out-of-date counter value that is not in sync with either the first electronic device 704 or the second electronic device 702. Accordingly, man-in-the-middle attacks over an unsecured interface can be for effectively defended against at least because a MAC is not reused for authentication.

In an embodiment, the first counter value 714 is a variable value that varies by, e.g., incrementing the value, or by generating a time-based incrementation, or other suitable incrementation scheme. The second counter value 712 at the authentic, trusted first electronic device 704 can be likewise incremented to maintain synchronization with the first counter value 714.

In an embodiment, the device command 706, the second MAC 716 and the second counter value 712 can be communicated in an encrypted fashion to the second electronic device 702 for execution. For example, the device command 706, the second MAC 716 and the second counter value 712 can, e.g., separately or together, be encrypted using a, e.g., symmetric or asymmetric encryption scheme, such as the symmetric and asymmetric encryption schemes described above. Accordingly, the device command 706, the second MAC 716 and the second counter value 712 can be hidden from unauthorized entities, such as, e.g., a man-in-the-middle, to further facilitate security of commands across an unsecured or secured interface.

At least some aspects of the present disclosure will now be described with reference to the following numbered clauses.

1. A method for securing device commands, the method comprising:
   receiving, by a first electronic device, a command authorization request message from a second electronic device, comprising:
   i) at least one first message authentication code (MAC),
   ii) at least one device command, and
   iii) at least one command argument;
   wherein the at least one device command is a respective command to be performed by the second electronic device;
   wherein the at least one first MAC has been generated by applying a one-way hash function to a first plurality of hash inputs;
   wherein the first plurality of hash inputs comprise:
   i) the at least one device command;
   ii) the at least one command argument; and
   iii) at least one first counter value;
   generating, by the first electronic device, at least one second MAC by applying the one-way hash function to a second plurality of hash inputs;
   wherein the second plurality of hash inputs comprise:
   i) the device command;
   ii) the at least one command argument; and
   iii) at least one second counter value;
   wherein the at least one first counter value is synchronized with the at least one second counter value;
   comparing, by the first electronic device, the at least one first MAC and the at least one second MAC to authenticate the at least one device command; and
   transmitting, by the first electronic device, one of:
   i) at least one command approval message to the second electronic device when the at least one first MAC matches the at least one second MAC, or ii) at least one command denial message to the second electronic device when the at least one first MAC does not match the at least one second MAC;

wherein the at least one command approval message is configured to cause the second electronic device to i) perform the at least one device command and ii) increment the at least one first counter value; and wherein the at least one command denial message is configured to cause the second electronic device to i) reject the at least one device command and ii) increment the at least one first counter value.

2. The method as recited in claim 1, further comprising decrypting the command authorization request message.

3. The method as recited in claim 1, further comprising encrypting the device command and the at least one command argument before generating the at least one first MAC.

4. The method as recited in claim 1, further comprising using the at least one first counter value as a hash key for the one-way hash function.

5. The method as recited in claim 1, further comprising using the at least one second counter value as a hash key for the one-way hash function.

6. The method as recited in claim 1, further comprising using a shared hash key shared between the first electronic device and the second electronic device for applying the one-way hash function.

7. The method as recited in claim 1, further comprising incrementing the at least one first counter value when receiving the command authorization request message.

8. The method as recited in claim 1, further comprising incrementing the at least one first counter value upon transmitting the at least one command approval message or the at least one command denial message.

9. The method as recited in claim 1, wherein the at least one first counter value is associated with the second electronic device according to a device ID stored on the first electronic device.

10. The method as recited in claim 1, the first electronic device is a server and the second electronic device is an automated teller machine (ATM).

11. A method for securing device commands, the method comprising:
   generating, at a second electronic device, at least one first MAC by applying a one-way hash function to a first plurality of hash inputs;
      wherein the first plurality of hash inputs comprise:
      i) an at least one device command;
      ii) an at least one command argument; and
      iii) at least one first counter value;
      wherein the at least one device command is a respective command to be performed by the second electronic device;
   generating, at the second electronic device, a command authorization request message, comprising:
      i) at least one first message authentication code (MAC),
      ii) at least one device command, and
      iii) at least one command argument;
   transmitting the command authorization request message to a first electronic device;
   receiving a response at the second electronic device from the first electronic device;
   wherein the response is generated according to a comparison of the at least one first MAC with an at least one second MAC;
   wherein the at least one second MAC is generated by applying the one-way hash function to a second plurality of hash inputs;
      wherein the second plurality of hash inputs comprise:
      i) the device command;
      ii) the at least one command argument; and
      iii) at least one second counter value;
   wherein the at least one first counter value is synchronized with the at least one second counter value;
   wherein the response comprises:
      i) at least one command approval message to the second electronic device when the at least one first MAC matches the at least one second MAC, or
      ii) at least one command denial message to the second electronic device when the at least one first MAC does not match the at least one second MAC;
   wherein the second electronic device is configured to i) perform the at least one device command and ii) increment the at least one first counter value, upon receiving the at least one command approval message; and
   wherein the second electronic device is configured to i) reject the at least one device command and ii) increment the at least one first counter value, upon receiving the at least one command denial message.

12. The method as recited in claim 11, further comprising encrypting the command authorization request message.

13. The method as recited in claim 11, further comprising encrypting the device command and the at least one command argument before generating the at least one first MAC.

14. The method as recited in claim 11, further comprising using the at least one first counter value as a hash key for the one-way hash function.

15. The method as recited in claim 11, further comprising using the at least one second counter value as a hash key for the one-way hash function.

16. The method as recited in claim 11, further comprising using a shared hash key shared between the first electronic device and the second electronic device for applying the one-way hash function.

17. The method as recited in claim 11, wherein the command authorization request message is configured to cause the first electronic device to increment the at least one first counter value.

18. The method as recited in claim 11, wherein the at least one command approval message and the at least one command denial message are configured to cause the first electronic device to increment the at least one first counter value.

19. The method as recited in claim 11, wherein the at least one first counter value is associated with the second electronic device according to a device ID stored on the first electronic device.

20. A system for securing device commands, the system comprising:
   an electronic device in communication with an authorization device, the electronic device configured to:
      generate a command authorization request message, comprising:
      i) at least one first message authentication code (MAC),
      ii) at least one device command, and
      iii) at least one command argument;
   wherein the at least one device command is a respective command to be performed by the electronic device;
   wherein the at least one first MAC has been generated at the electronic device by applying a one-way hash function to a first plurality of hash inputs;
      wherein the first plurality of hash inputs comprise:
      i) the at least one device command;
      ii) the at least one command argument; and
      iii) at least one first counter value;

transmit the command authorization request message to the authorization device;

receive a response from the authorization device;

wherein the response is generated according to a comparison of the at least one first MAC with an at least one second MAC;

wherein the at least one second MAC is generated by applying the one-way hash function to a second plurality of hash inputs;

wherein the second plurality of hash inputs comprise:
i) the device command;
ii) the at least one command argument; and
iii) at least one second counter value;

wherein the at least one first counter value is synchronized with the at least one second counter value;

wherein the response comprises:
i) at least one command approval message to the second electronic device when the at least one first MAC matches the at least one second MAC, or
ii) at least one command denial message to the second electronic device when the at least one first MAC does not match the at least one second MAC;

perform the at least one device command and ii) increment the at least one first counter value, upon receiving the at least one command approval message; and reject the at least one device command and ii) increment the at least one first counter value, upon receiving the at least one command denial message.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method for securing device commands, the method comprising:

receiving, by a first electronic device, a command authorization request message having transient hashing from a second electronic device, comprising:
  i) at least one first message authentication code (MAC),
  ii) at least one device command, and
  iii) at least one command argument;

wherein the at least one device command is a respective command to be performed by the second electronic device;

wherein the at least one first MAC has been generated by applying a one-way hash function to a first plurality of hash inputs to produce the non-reusable hashing;

wherein the first plurality of hash inputs comprise:
  i) the at least one device command;
  ii) the at least one command argument; and
  iii) at least one first counter value;

generating, by the first electronic device, at least one second MAC by applying the one-way hash function to a second plurality of hash inputs to reproduce the non-reusable hashing;

wherein the second plurality of hash inputs comprise:
  i) the device command;
  ii) the at least one command argument; and
  iii) at least one second counter value;

wherein the at least one first counter value is synchronized with the at least one second counter value;

comparing, by the first electronic device, the at least one first MAC and the at least one second MAC to authenticate the at least one device command; and transmitting, by the first electronic device, one of:
  i) at least one command approval message to the second electronic device when the at least one first MAC matches the at least one second MAC, or
  ii) at least one command denial message to the second electronic device when the at least one first MAC does not match the at least one second MAC;

wherein the at least one command approval message is configured to cause the second electronic device to i) automatically perform the at least one device command and ii) increment the at least one first counter value;

wherein the at least one command denial message is configured to cause the second electronic device to i) reject the at least one device command and ii) increment the at least one first counter value; and wherein incrementing the at least one first counter value results in the non-reusable hashing of the command authorization request message being expired such that each MAC generated by the one-way hash function for every message is unique.

2. The method as recited in claim 1, further comprising decrypting the command authorization request message.

3. The method as recited in claim 1, further comprising encrypting the device command and the at least one command argument before generating the at least one first MAC.

4. The method as recited in claim 1, further comprising using the at least one first counter value as a hash key for the one-way hash function.

5. The method as recited in claim 1, further comprising using the at least one second counter value as a hash key for the one-way hash function.

6. The method as recited in claim 1, further comprising using a shared hash key shared between the first electronic device and the second electronic device for applying the one-way hash function.

7. The method as recited in claim 1, further comprising incrementing the at least one first counter value when receiving the command authorization request message.

8. The method as recited in claim 1, further comprising incrementing the at least one first counter value upon transmitting the at least one command approval message or the at least one command denial message.

9. The method as recited in claim 1, wherein the at least one first counter value is associated with the second electronic device according to a device ID stored on the first electronic device.

10. The method as recited in claim 1, the first electronic device is a server and the second electronic device is an automated teller machine (ATM).

11. A method for securing device commands, the method comprising:

generating, at a second electronic device, at least one first message authentication code (MAC) by applying a one-way hash function to a first plurality of hash inputs to produce a non-reusable hashing;

wherein the first plurality of hash inputs comprise:
  i) an at least one device command;
  ii) an at least one command argument; and
  iii) at least one first counter value;

wherein the at least one device command is a respective command to be performed by the second electronic device;

generating, at the second electronic device, a command authorization request message having the non-reusable hashing, comprising:
- i) at least one first message authentication code (MAC),
- ii) at least one device command, and
- iii) at least one command argument;

transmitting the command authorization request message to a first electronic device;

receiving a response at the second electronic device from the first electronic device;

wherein the response is generated according to a comparison of the at least one first MAC with an at least one second MAC;

wherein the at least one second MAC is generated by applying the one-way hash function to a second plurality of hash inputs to reproduce the non-reusable hashing;

wherein the second plurality of hash inputs comprise:
- i) the device command;
- ii) the at least one command argument; and
- iii) at least one second counter value;

wherein the at least one first counter value is synchronized with the at least one second counter value;

wherein the response comprises:
- i) at least one command approval message to the second electronic device when the at least one first MAC matches the at least one second MAC, or
- ii) at least one command denial message to the second electronic device when the at least one first MAC does not match the at least one second MAC;

wherein the second electronic device is configured to i) automatically perform the at least one device command and ii) increment the at least one first counter value, upon receiving the at least one command approval message; and wherein the second electronic device is configured to i) reject the at least one device command and ii) increment the at least one first counter value, upon receiving the at least one command denial message; and wherein incrementing the at least one first counter value results in the non-reusable hashing of the command authorization request message being expired such that each MAC generated by the one-way hash function for every message is unique.

12. The method as recited in claim 11, further comprising encrypting the command authorization request message.

13. The method as recited in claim 11, further comprising encrypting the device command and the at least one command argument before generating the at least one first MAC.

14. The method as recited in claim 11, further comprising using the at least one first counter value as a hash key for the one-way hash function.

15. The method as recited in claim 11, further comprising using the at least one second counter value as a hash key for the one-way hash function.

16. The method as recited in claim 11, further comprising using a shared hash key shared between the first electronic device and the second electronic device for applying the one-way hash function.

17. The method as recited in claim 11, wherein the command authorization request message is configured to cause the first electronic device to increment the at least one first counter value.

18. The method as recited in claim 11, wherein the at least one command approval message and the at least one command denial message are configured to cause the first electronic device to increment the at least one first counter value.

19. The method as recited in claim 11, wherein the at least one first counter value is associated with the second electronic device according to a device ID stored on the first electronic device.

20. A system for securing device commands, the system comprising:
an electronic device in communication with an authorization device, the electronic device configured to:
generate a command authorization request message having non-reusable hashing, comprising:
- i) at least one first message authentication code (MAC),
- ii) at least one device command, and
- iii) at least one command argument;

wherein the at least one device command is a respective command to be performed by the electronic device;

wherein the at least one first MAC has been generated at the electronic device by applying a one-way hash function to a first plurality of hash inputs to produce the non-reusable hashing;

wherein the first plurality of hash inputs comprise:
- i) the at least one device command;
- ii) the at least one command argument; and
- iii) at least one first counter value;

transmit the command authorization request message to the authorization device;

receive a response from the authorization device;

wherein the response is generated according to a comparison of the at least one first MAC with an at least one second MAC;

wherein the at least one second MAC is generated by applying the one-way hash function to a second plurality of hash inputs to reproduce the non-reusable hashing;

wherein the second plurality of hash inputs comprise:
- i) the device command;
- ii) the at least one command argument; and
- iii) at least one second counter value;

wherein the at least one first counter value is synchronized with the at least one second counter value;

wherein the response comprises:
- i) at least one command approval message to the second electronic device when the at least one first MAC matches the at least one second MAC, or
- ii) at least one command denial message to the second electronic device when the at least one first MAC does not match the at least one second MAC;

automatically perform the at least one device command and ii) increment the at least one first counter value, upon receiving the at least one command approval message; and reject the at least one device command and ii) increment the at least one first counter value, upon receiving the at least one command denial message; and wherein incrementing the at least one first counter value results in the non-reusable hashing of the command authorization request message being expired such that each MAC generated by the one-way hash function for every message is unique.

* * * * *